United States Patent
Palazzolo et al.

(10) Patent No.: US 12,370,972 B2
(45) Date of Patent: Jul. 29, 2025

(54) KNEE AIRBAG

(71) Applicant: ZF Passive Safety Systems US Inc., Washington, MI (US)

(72) Inventors: Joseph Palazzolo, Shelby Township, MI (US); Jaime Fermin Perez, Lake Orion, MI (US); Douglas Gould, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 18/124,245

(22) Filed: Mar. 21, 2023

(65) Prior Publication Data
US 2024/0317170 A1   Sep. 26, 2024

(51) Int. Cl.
| | | |
|---|---|---|
| *B60R 21/206* | (2011.01) | |
| *B60R 21/205* | (2011.01) | |
| *B60R 21/231* | (2011.01) | |
| *B60R 21/2338* | (2011.01) | |
| *B60R 21/26* | (2011.01) | |
| *B60R 21/233* | (2006.01) | |

(52) U.S. Cl.
CPC .......... *B60R 21/206* (2013.01); *B60R 21/205* (2013.01); *B60R 21/2338* (2013.01); *B60R 21/26* (2013.01); *B60R 2021/23169* (2013.01); *B60R 2021/23316* (2013.01); *B60R 2021/23386* (2013.01)

(58) Field of Classification Search
CPC ........... B60R 2021/23169; B60R 2021/23382; B60R 2021/23386; B60R 2021/23316; B60R 2021/0051; B60R 2021/0053; B60R 21/206; B60R 21/2338; B60R 21/26; B60R 21/231; B60R 21/205
USPC .............. 280/730.1, 732, 743.1, 743.2
See application file for complete search history.

(56) References Cited

U.S. PATENT DOCUMENTS

| | | | |
|---|---|---|---|
| 2,834,606 A | 5/1958 | Bertrand | |
| 6,464,255 B1 | 10/2002 | Preisler et al. | |
| 11,001,220 B2 | 5/2021 | Fukawatase et al. | |
| 11,001,221 B2 | 5/2021 | Fukawatase et al. | |
| 2004/0113399 A1* | 6/2004 | Yoshikawa | B60R 21/231 280/752 |
| 2004/0251665 A1* | 12/2004 | Kumagai | B60R 21/2165 280/730.1 |
| 2007/0200320 A1* | 8/2007 | Keshavaraj | B60R 21/206 280/743.2 |

(Continued)

FOREIGN PATENT DOCUMENTS

| | | | |
|---|---|---|---|
| JP | H11115675 A | * | 4/1999 |
| JP | 2002362279 A | * | 12/2002 |

(Continued)

*Primary Examiner* — Keith J Frisby
(74) *Attorney, Agent, or Firm* — Tarolli, Sundheim, Covell & Tummino LLP (57) ABSTRACT

A knee airbag module for a vehicle includes an airbag housing configured to be mounted in an instrument panel of the vehicle at a position above a glove box of the instrument panel. The module also includes a knee airbag comprising overlying panels interconnected along a perimeter connection to define an inflatable volume of the knee airbag. The knee airbag has a stored condition in the airbag housing and is configured to inflate and deploy in a direction that is downward and forward into a footwell of the vehicle.

21 Claims, 7 Drawing Sheets

(56) References Cited

U.S. PATENT DOCUMENTS

| | | | | |
|---|---|---|---|---|
| 2008/0147278 A1* | 6/2008 | Breed | ............... | B60R 21/231 |
| | | | | 701/45 |
| 2010/0019473 A1* | 1/2010 | Dennis | ............... | B60R 21/206 |
| | | | | 280/729 |
| 2012/0025498 A1* | 2/2012 | Tanaka | ............... | B60R 21/233 |
| | | | | 280/730.2 |
| 2015/0115580 A1* | 4/2015 | Gould | ............... | B60R 21/206 |
| | | | | 280/730.1 |
| 2016/0059815 A1* | 3/2016 | Jung | ............... | B60R 21/237 |
| | | | | 280/730.1 |
| 2021/0229616 A1* | 7/2021 | Shrivatri | ............... | B60R 21/233 |
| 2023/0135921 A1* | 5/2023 | Ko | ............... | B60R 21/231 |
| | | | | 280/735 |

FOREIGN PATENT DOCUMENTS

| | | | |
|---|---|---|---|
| JP | 2006224776 A | * | 8/2006 |
| JP | 2007069737 A | * | 3/2007 |
| JP | 2007137150 A | * | 6/2007 |
| JP | 2011056992 A | * | 3/2011 |
| JP | 2011143856 A | * | 7/2011 |
| KR | 102337340 X | | 12/2021 |

* cited by examiner

KNEE AIRBAG

TECHNICAL FIELD

This disclosure relates to an apparatus for helping to protect an occupant of a vehicle upon the occurrence of an event, such as a vehicle collision. More particularly, this disclosure relates to a knee airbag.

BACKGROUND

It is known to deploy an inflatable vehicle occupant protection device, such as an airbag, upon the occurrence of an event for which occupant protection is desired, such as a vehicle collision or rollover. The airbag is part of a conventional vehicle occupant protection apparatus that includes a sensor and an inflation fluid source, such as an inflator. Upon sensing the occurrence of an event for which deployment of the airbag is desired, the inflation fluid source is actuated and produces inflation fluid that inflates the airbag, causing it to deploy into the vehicle occupant compartment to help protect the vehicle occupants.

One particular type of inflatable vehicle occupant protection device is a knee airbag. Knee airbags are typically stored in a housing that is mounted in the lower portion of the instrument panel, in the area of the footwell. Knee airbags are inflatable to a deployed condition in which the knee airbag is positioned between the occupant's legs and the instrument panel to help protect the vehicle occupant from injury, particularly to the occupant's legs.

SUMMARY

A knee airbag has a configuration that provides a reduction in material cost while, at the same time, improves trajectory and stability. The knee airbag is a component of a knee airbag module positioned in an instrument panel of the vehicle at a location above a glove box of the vehicle. According to this configuration, the knee airbag can have a smaller volume and footprint because the knee airbag module is positioned close to the location on the instrument panel where the occupant's knees are likely to impact the instrument panel. Additionally, the position of the module is such that inflation and deployment of the knee airbag is generally downward and forward in the vehicle, toward/into the footwell and away from the occupant. The knee airbag thus deploys in the same direction that the occupant moves in response to a frontal collision, instead of moving in an opposite direction, toward the occupant. This can greatly reduce the effective velocity at which the knees might impact the airbag.

The knee airbag can also have a T-shaped configuration with a low volume filling portion that reduces the volume of inflation fluid required to fill and pressurize a cushion portion of the knee airbag, as well as improving the deployment time and efficiency. The knee airbag can be sewn easily using automated sewing machines, and its generally flat sewn configuration is ideal for automated folding. Tethers can be used to stabilize the airbag and/or to help control the deployment trajectory and inflated position of the airbag along the instrument panel.

According to one aspect, a knee airbag module for a vehicle includes an airbag housing configured to be mounted in an instrument panel of the vehicle at a position adjacent an upper surface and a front surface of the instrument panel above a glove box of the instrument panel. The module also includes a knee airbag comprising overlying panels interconnected along a perimeter connection to define an inflatable volume of the knee airbag. The knee airbag has a stored condition in the airbag housing and is configured to inflate and deploy in a direction that is downward and forward into a footwell of the vehicle.

According to another aspect, the airbag housing can be configured to be mounted above a glove box of the instrument panel.

According to another aspect, the knee airbag can be configured to inflate and deploy between the instrument panel and the legs of an occupant. The knee airbag can include an impact surface configured to face toward the occupant when the knee airbag is inflated. The knee airbag can be configured so that the impact surface extends downward and forward from the airbag housing when the knee airbag is in an inflated and deployed condition.

According to another aspect, the knee airbag can be configured to have an inflated shape that, in combination with the trajectory along which the knee airbag inflates and deploys causes the knee airbag, when inflated, to extend along the contour of an instrument panel surface facing an occupant of a vehicle seat positioned facing the instrument panel.

According to another aspect, the knee airbag module recited can include at least one tether configured to control the shape of the knee airbag and/or the trajectory along which the knee airbag inflates and deploys so that the knee airbag, when inflated, extends along the contour of the instrument panel surface facing the occupant of the vehicle seat.

According to another aspect, the at least one tether can be configured to enforce a curve of the knee airbag that extends away from the occupant.

According to another aspect, the at least one tether can be connected to a panel of the knee airbag configured to face and/or engage an instrument panel surface facing the occupant.

According to another aspect, the at least one tether can be an external tether connected to an external surface of the knee airbag panel.

According to another aspect, the at least one tether has a length and opposite ends spaced along the length. The opposite ends can be connected to the airbag at locations on the airbag spaced a distance that is greater than the length of the at least one tether.

According to another aspect, the at least one tether has a length and opposite first and second ends spaced along the length. The first end of the at least one tether can be connected to an exterior surface of the cushion portion and the second end of the at least one tether can be configured for connection to the airbag housing.

According to another aspect, the at least one tether can be configured to become tensioned in response to the knee airbag being inflated. The at least one tether also can be configured to enforce a curved configuration of the knee airbag in response to being tensioned in response to the knee airbag being inflated.

According to another aspect, the at least one tether can have a first end connected to the cushion portion vertically above a centerline of the knee airbag, and an opposite second end connected to the filling portion along the centerline of the knee airbag.

According to another aspect, the knee airbag can also include a lower portion configured to curve away from the instrument panel into the footwell toward an area in the footwell where an occupant's feet and lower legs are positioned.

According to another aspect, the knee airbag can include a filling portion and a cushion portion. The filling portion can be configured to receive inflation fluid from an inflator and to direct the inflation fluid from the inflator to the cushion portion. The cushion portion can have a width that is greater than a width of the filling portion and extending laterally beyond the width of the filling portion on opposite sides of the filling portion According to another aspect, the filling portion can have a first end configured to receive inflation fluid from the inflator. The cushion portion can be fluidly connected to the filling portion at a second end of the filling portion, opposite the first end of the filling portion.

According to another aspect, the knee airbag can be configured to have a generally T-shape. The filling portion can have a length that extends along a centerline of the knee airbag and a width that extends transverse to the length. The cushion portion can have a width that extends transverse to the centerline and laterally beyond opposite lateral sides of the filling portion.

According to another aspect, the overlying panels can be interconnected within the perimeter connection along one or more interior connections that define inflatable chambers within the inflatable volume.

According to another aspect, the overlying panels can include flat fabric panels that are similarly or identically patterned, wherein the panels are configured to lie flat in the overlying manner while the perimeter connection and any interior connections within the perimeter connection are formed.

According to another aspect, the perimeter connection and any interior connections within the perimeter connection can be formed by stitching or ultrasonic welding.

According to another aspect, the knee airbag module can also include an inflator for inflating the knee airbag. According to another aspect, a vehicle safety system can include the knee airbag module, a sensor configured to sense the occurrence of an event for which deployment of the knee airbag is desired, and a controller configured to actuate the inflator to deploy the knee airbag in response to the sensor.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Figure 1:
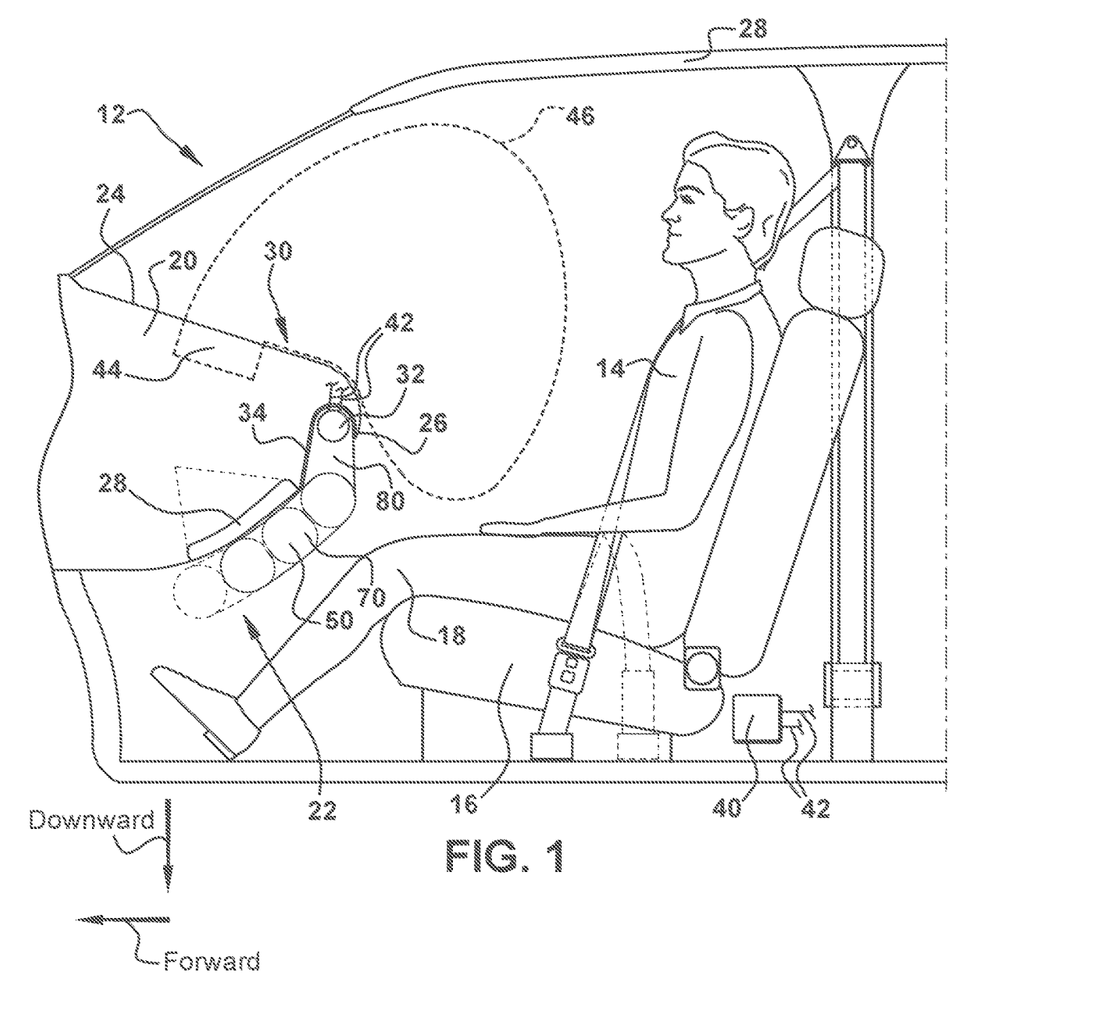
FIG. 1 is a side view that illustrates schematically a vehicle safety system including an apparatus for helping to protect an occupant of a vehicle.

A vehicle safety system 10 for helping to protect an occupant 14 of a vehicle 12 is shown in FIG. 1. The safety system 10 includes an apparatus in the form of a knee airbag module 30 that includes an inflatable knee airbag 50, an inflator 32 for inflating the knee airbag 50, and a housing 34 for supporting the knee airbag and inflator. The knee airbag module 30 is configured to be connected to an upper portion of an instrument panel 20 of the vehicle 12 at or near an intersection of an upper surface 24 and a front surface 26 of the instrument panel. As shown in FIG. 1, the knee airbag module 30 can be mounted in the instrument panel above a glove box 28.

The safety system 10 can also include a frontal airbag module 44 mounted in the instrument panel 20 above the knee airbag module 30. In another configuration, the system and apparatus 10 can include an airbag module that includes both the frontal airbag 46 and the knee airbag 50. In this implementation, both airbags could be inflated by a single shared inflator. The frontal airbag 46 is inflatable from the instrument panel between the head and upper torso of the occupant 14 in the event of a frontal collision. The knee airbag 50 is inflatable between the instrument panel 20 and occupants legs in the event of frontal and other collisions. The frontal airbag 46 and the knee airbag 50 combine to help protect the occupant 14 from impacts with the instrument panel in the event of frontal and other collisions.

In the embodiment illustrated in FIG. 1, the knee airbag module 30 is a passenger knee airbag module configured to help protect the occupant 14 on a passenger side seat 16 of the vehicle 12. The knee airbag 50 has a stored condition (not shown) in which the knee airbag is folded and placed in the housing 34. The housing 34 helps contain and support the knee airbag 50 in the instrument panel 20. The knee airbag module 30 is concealed in the instrument panel 20, for example, by a cover in the form of a door or panel that is a component of the module itself, a portion of the instrument panel, a trim piece of the instrument panel, or a combination of these components.

The inflator 32 is actuatable to provide inflation fluid to an inflatable volume of the knee airbag 50 to deploy the knee airbag to the inflated condition, which is shown in solid lines in FIG. 1. The inflator 32 may be of any known type, such as a solid propellant or stored gas design, or a hybrid design implementing both solid propellant and stored gas. The safety system 10 includes a sensor, illustrated schematically at 40, for sensing an event for which inflation of the knee airbag 50 is desired, such as a collision. The inflator 32 is operatively connected to the sensor 40 via lead wires 42.

In FIG. 1, the inflator 32 is illustrated as being directly connected to the knee airbag 50. This configuration is efficient, as the inflator 32 can, for example, be installed directly in the knee airbag 50 while, at the same time, being connected to the module housing 34. In this configuration, the inflator 34 can include mounting studs that extend through aligned openings in the knee airbag 50 and housing 34 so that the studs can connect the entire airbag module 30, including the airbag, inflator, and housing, to the vehicle 12. The airbag module 30, however, being configured for a high-mount installation, e.g., above the glovebox 28, could necessitate an alternative configuration. For example, due to space limitations and/or vehicle architecture configurations, the inflator 32 could be mounted in a location that is remote from the knee airbag 50 and housing 34. In this configuration, inflation fluid can be delivered to the knee airbag 50 from the remotely located inflator 32 by a fill tube, such as a rigid tubular conduit or a flexible hose.

The knee airbag 50 can be constructed of any suitable material, such as a woven nylon (e.g., nylon 6-6), and may be constructed in any suitable manner. For example, the knee airbag 50 may include one or more pieces or panels of material. If more than one piece or panel is used, the pieces or panels may be interconnected by known means, such as stitching, ultrasonic welding, heat bonding, or adhesives, to form the knee airbag 50. As will be described below, the knee airbag 50 can have a simplified construction that helps minimize the complexity of manufacture.

For example, the knee airbag 50 can be constructed of overlying panels of material, having a similar or identical shape or pattern, that are interconnected via stitching along a periphery of the panels to define the perimeter of the inflatable volume. The panels can be interconnected along connections within the peripheral connection to define inflatable chambers of the knee airbag 50. This simplified flat construction can facilitate automated cutting and stitching of the panels, which helps reduce the manual labor required to produce the knee airbag 50.

As another example, the knee airbag 50 can have a one piece woven (OPW) construction in which the airbag is woven as a whole in a single weaving process. In this construction, the overlying panels are woven simultaneously, with their peripheries woven together as a single layer to define a peripheral connection that defines the inflatable volume of the knee airbag 50. The panels can also be interwoven as a single layer to define inflatable chambers within the peripheral connection. The OPW process produces a flat construction that helps reduce or minimize the manual labor required to produce the knee airbag 50.

The knee airbag 50 may be uncoated, coated with a material, such as a gas impermeable urethane, or laminated with a material, such as a gas impermeable film. The knee airbag 50 thus may have a gas-tight or substantially gas-tight construction. Those skilled in the art will appreciate that alternative materials, such as polyester yarn, and alternative coatings, such as silicone, may also be used to construct the knee airbag 50.

Figure 2:
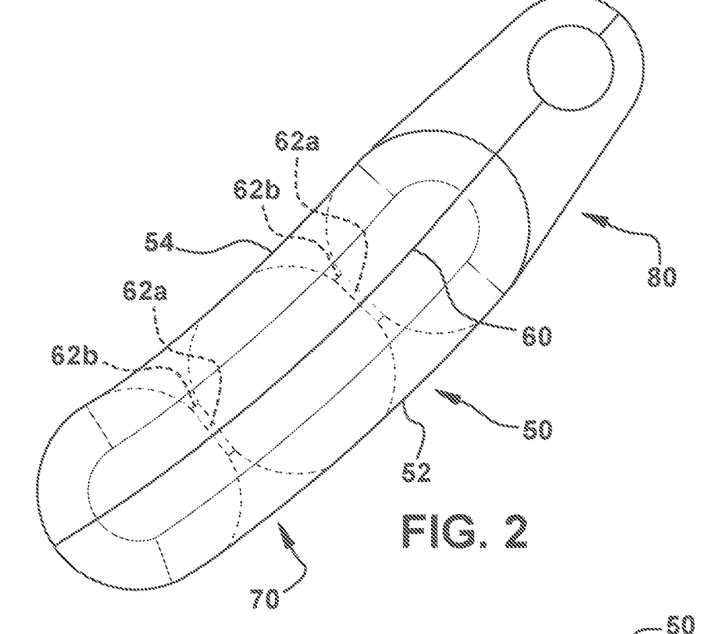
FIG. 2 is a side view of the knee airbag of FIG. 2.
Figure 3:
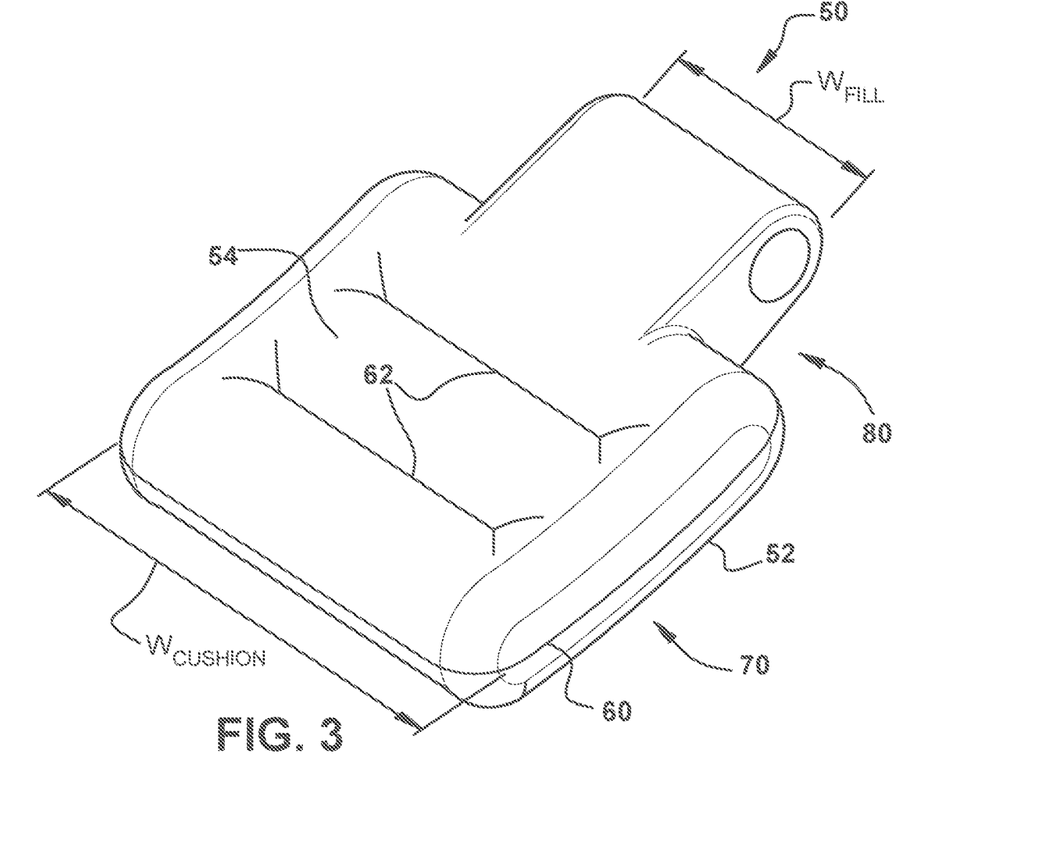
FIG. 3 is a perspective view of a knee airbag that forms a portion of the vehicle safety system, according to an example configuration.
Figure 4:
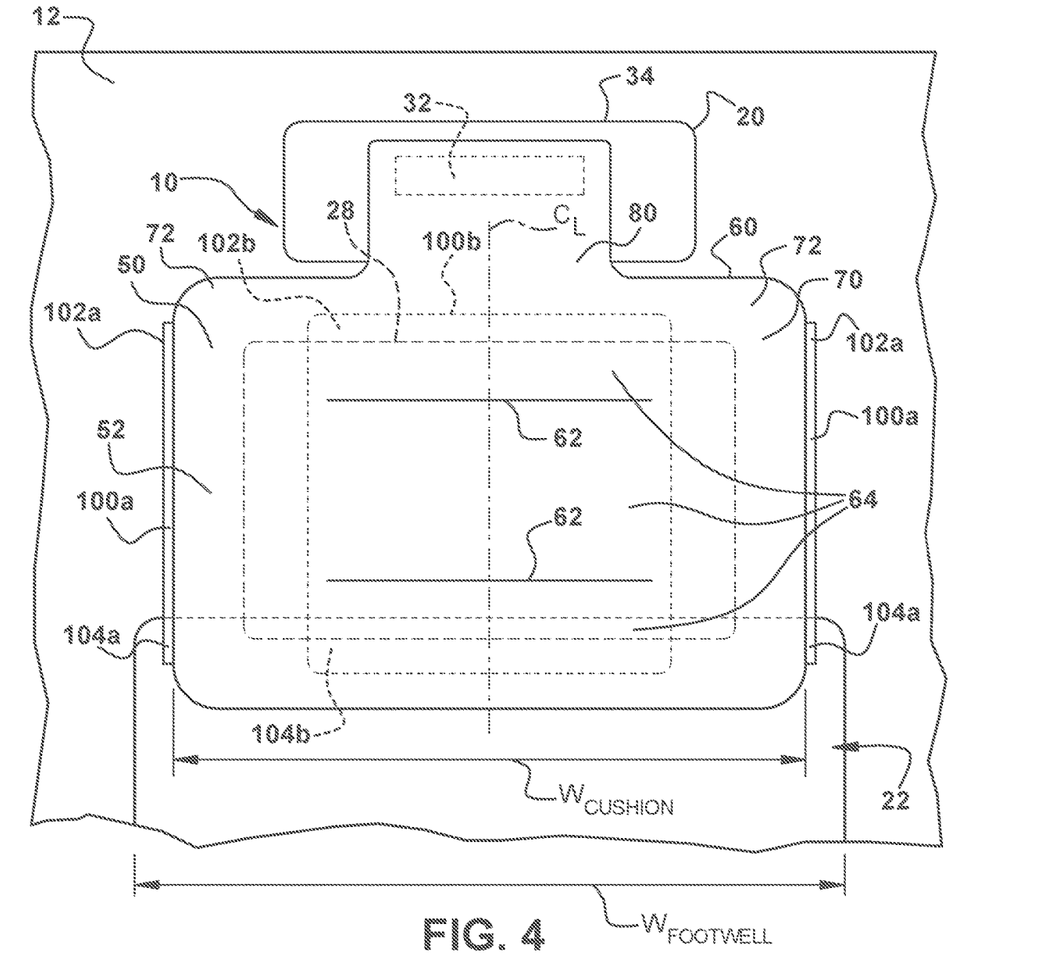
FIG. 4 is a plan view illustrating example configurations of the knee airbag.

An example configuration of the knee airbag 50 is illustrated in FIGS. 2-4. As shown in these figures, the knee airbag 50 has a simple construction, with a front panel 52 configured to face the occupant 14 and a rear panel 54 configured to engage the instrument panel 20. The front and rear panels 52, 54 are interconnected about a peripheral connection 60, such as an OPW single layer seam or a stitched, adhesively connected, or welded seam. Within the periphery, the panels 52, 54 can be interconnected at one or more interior connections 62, such as a single-layer OPW portion, a direct panel-to-panel connection via a stitched, adhesively connected, or welded seam, or via a tether connected to both the front panel and rear panel, again via a stitched connection, adhesive connection, or welded connection. Implementing a tether could, however, increase the complexity of the manufacturing process used to construct the knee airbag 50. Regardless of the construction, the interior connections 62 help limit the expansion of the panels 52, 54, control the inflated thickness of the knee airbag 50, as measured between the front and rear panels, and define inflatable chambers 64 of the knee airbag.

For example, as shown at 62a in FIG. 2, the connection can be a direct connection between the panels 52, 54, such as a stitched connection, OPW connection, adhesive connection, or welded connection. Alternatively, as shown at 62b in FIG. 2, the connection can be a tether connection in which the panels 52, 54, are connected by a tether that extends between the panels and is connected to the panels via a connection, such as a stitched connection, OPW connection, adhesive connection, or welded connection.

The knee airbag 50 has a cushion portion 70 and a filling portion 80. The filling portion 80 is connected to the inflator 32 and receives inflation fluid from the inflator. The filling portion 80 directs the inflation fluid to the cushion portion 70. The filling portion 80 is configured to extend along a portion of the instrument panel 20 above the glovebox 28 and perhaps extending along the glovebox, depending on the configuration of the vehicle 12 and the instrument panel. The filling portion 80 extends along a portion of the instrument panel 20 covered by the frontal airbag 46 and therefore is not expected to cushion the occupant 14. This being the case, the filling portion 80 is configured to have a narrowed, reduced cross-sectional area, as its purpose is not necessarily to provide cushioning, but to deliver inflation fluid to the cushion portion 70.

As shown in FIG. 1, cushion portion 70 covers a portion of the instrument panel 20 where occupant protection from impacts between his or her legs is desired. As such, referring to FIG. 3, the cushion portion 70 has a width $W_{Cushion}$ that is greater than a width $W_{Fill}$ of the filling portion 80. The width $W_{Cushion}$ of the cushion portion 70 is configured to extend widthwise across the instrument panel 20 to an extent that the cushion portion 70 covers the instrument panel 20 across or substantially across the width of the footwell 22, indicated generally at $W_{Footwell}$ in FIG. 4.

The cushion portion 70 is defined, in part, by the interior connections 62. The interior connections 62 of the cushion portion 70 are lateral in nature, meaning that they are configured to extend widthwise across the airbag 50, i.e., across the instrument panel 20 and footwell 22, as viewed from the perspective of the seated occupant 14. The horizontally extending interior connections 62 help define the horizontally extending inflatable chambers 64 of the cushion portion 70 of the knee airbag 50.

Figure 5:
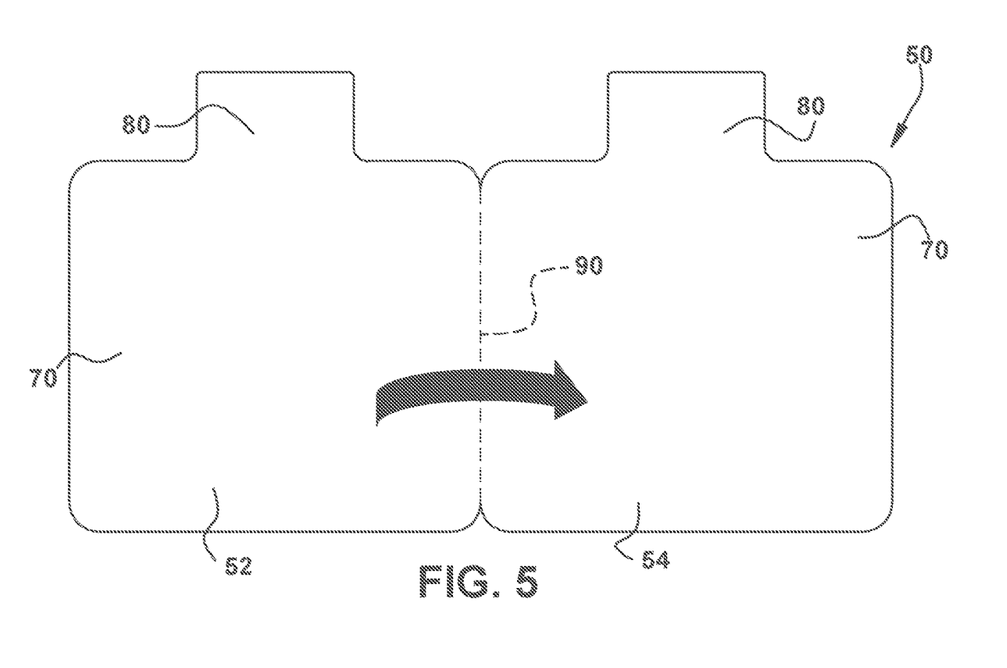
FIG. 5 is a plan view illustrating an example flat construction configuration of the knee airbag.

The construction of the knee airbag 50 can be as simple as that of a flat-sewn construction, implementing overlying flat panels 52, 54 with a peripheral stitched connection 60 extending about their peripheries and stitched interior connections 62 defining the inflatable chambers 64. The panels 52, 54 can be similar or identical, which allows for ease in production, as the panels can be cut from stock fabric materials in an automated fashion, implementing a cut pattern that nests the panels to minimize material waste. By "similar," it is meant that one of the panels 52, 54 might include features, such as fastener openings, that are not included in the other panel, while the overall shape/configurations of the panels remains identical. The flat-sewn construction also lends to automated sewing because the panels 52, 54 require no re-positioning or manipulation other than being lying flat on top of each other. Furthermore, in a flat-sewn construction, the panels 52, 54 can be formed as a single panel delineated by a fold 90 that forms one "leg" of the peripheral connection (see FIG. 5), with the remaining legs being stitched or otherwise connected. This further lends to an automated construction, as the panels can be cut, folded, and stitched, all via machine with little or no human manipulation required.

This construction, while efficient and cost-effective, is not absolute. For example, the flat-sewn constructions described in the preceding paragraph can be modified to implement laser cutting, ultrasonic welding, adhesive connections to form any or all of the connections 60, 62. An OPW construction, while avoiding the time and cost of separate cutting, panel positioning, and stitching/connecting steps, would add the cost associated with the complex equipment required to perform the weaving operation and the increased time that weaving involves.

In one alternative configuration, the interior connections 62 can be formed by tethers (see tether 62b in FIG. 2) that interconnect the panels 52, 54. In a sewn construction of the airbag 50, the tethers 62 would increase the complexity of the airbag construction and the manufacturing process used to produce the same. Still, using tethers, such as elongated, rectangular, generally uniform tethers to control the thickness of the bag and provide inflatable chambers 64, is simple and inexpensive to produce in comparison with more complicated constructions.

In addition to controlling the inflated thickness of the cushion portion 70 of the knee airbag 50, the interior connections 62 forming the horizontally extending chambers 64 of the cushion portion can also help control the inflation characteristics of the cushion portion specifically and the knee airbag in general. Because the inflation fluid is directed axially through the filling portion 80, generally along a central axis or centerline $C_L$ (see FIG. 4) of the knee airbag 50, and because the chambers 64 extend transverse, e.g., perpendicular, to the centerline, the interior connections 62 forming the chambers directs or redirects the inflation fluid into the chambers. This redirection is done via passages formed by the interior connections 62, either by breaks in the connections, by spacing end points of the connections from the peripheral connections 60, or by a combination thereof.

Figure 6A:
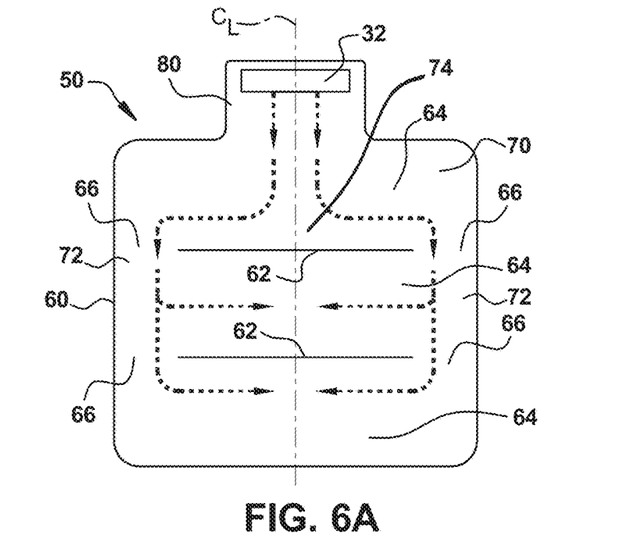
FIGS. 6A-6C are plan views showing variations in chamber configurations that can be implemented in the knee airbag.
Figure 6B:
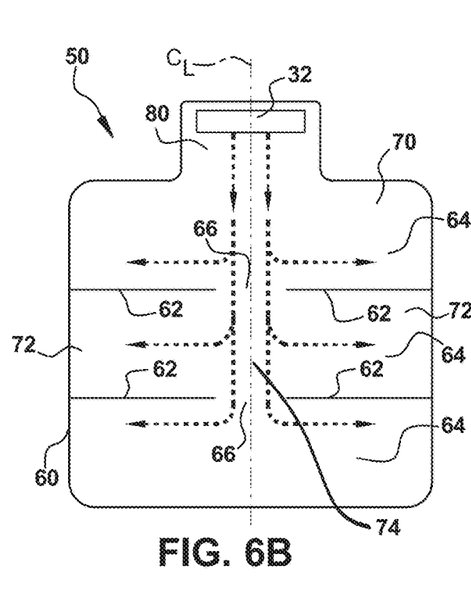
Figure 6C:
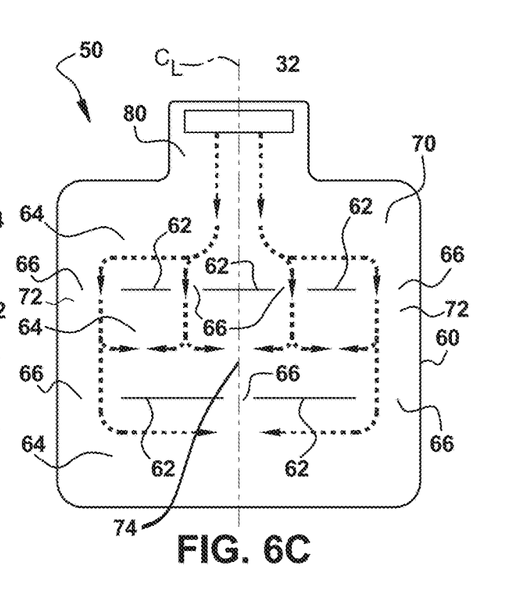

For example, referring to FIGS. 6A-C, passages 66 between the chambers 64 of the cushion portion 70 are formed by breaks in the interior connections 62 themselves (FIGS. 6B & 6C), by spacing between ends of the interior connections and the peripheral connection 60 (FIGS. 6A & 6C), and by a combination thereof (FIG. 6C). The example configurations of FIGS. 6A-C illustrate how the interior connections 62 and the passages 66 formed by the interior connections can help control deployment of the knee airbag 50, particularly the cushion portion 70.

In FIG. 6A, the interior connections 62 are unbroken, with opposite ends spaced from the peripheral connections 60. The passages 66 in FIG. 6A are therefore located at opposite ends of the chambers 64. In this configuration, the interior connections 62 and passages 66 direct inflation fluid to fill the chambers 64 from the ends inward toward the centerline $C_L$. As a result of this outward-in inflation, lateral end portions 72 of the cushion portion 70 inflate first, followed by a center portion 74 of the cushion portion. This can be beneficial in that the end portions, which correspond to the knee positions of a normally seated occupant, can inflate first. Of course, this outward-in inflation requires an initial outward diversion of the fluid flow path, followed by a redirection around the ends of the interior connections 62 and back in toward the centerline $C_L$. Therefore, the outward-in inflation of the cushion portion 70 in the example configuration of FIG. 6A could be desirable or effective in a vehicle where the configuration of the vehicle 12, particularly the footwell 22 necessitates a more narrow width of the cushion portion.

In FIG. 6B, the interior connections 62 are broken, with opposite ends intersecting the peripheral connections 60. The passages 66 in FIG. 6B are therefore located centrally in the chambers 64. In this configuration, the interior connections 62 and passages 66 direct inflation fluid to fill the chambers 64 from the middle, i.e., from the centerline $C_L$, laterally outward into the chambers. As a result of this inward-out inflation, the center portion 74 inflates first, followed by the lateral end portions 72. This can be beneficial in that the inflation fluid is directed axially along the filling portion 80 into the center portion 74, where it is redirected laterally outward into the end portions 72. This single redirection of inflation fluid flow can be more direct than other configurations, such as an outward-in configuration. Therefore, the inward-out inflation of the cushion portion 70 in the example configuration of FIG. 6B could be desirable or effective in a vehicle where the configuration of the vehicle 12, particularly the footwell 22 necessitates a widened width of the cushion portion.

In FIG. 6C, the configurations of the interior connections 62 combine features of the configurations illustrated in FIGS. 6A and 6B. More specifically, the connections 62 have end portions spaced from the peripheral connection 60 and are also broken along their lengths. The passages 66 in FIG. 6C are therefore located both at the ends of the chambers 64 and centrally in the chambers. In this configuration, the interior connections 62 and passages 66 direct inflation fluid to fill the chambers 64 from the middle out and from the ends in. This can promote a more uniform inflation of the cushion portion 70 across its width because the inflation fluid is directed in both outward-in and inward-out directions. Therefore, the configuration of the cushion portion 70 in the example configuration of FIG. 6C could be desirable or effective in a vehicle where the configuration of the vehicle 12, particularly the footwell 22 necessitates rapid inflation and deployment. This could be the case, for example, where the vehicle has a more confined footwell with structures positioned close to the occupant.

Figure 7A:
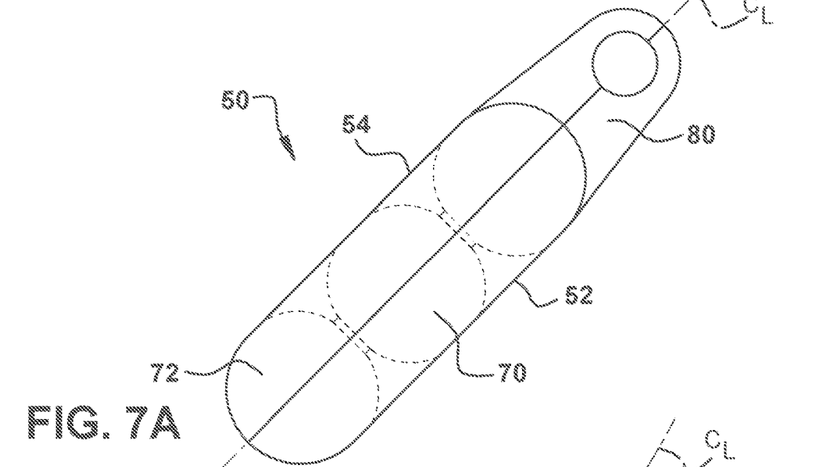
FIGS. 7A-7C are side views showing different example curve configurations that can be implemented in the knee airbag.
Figure 7B:
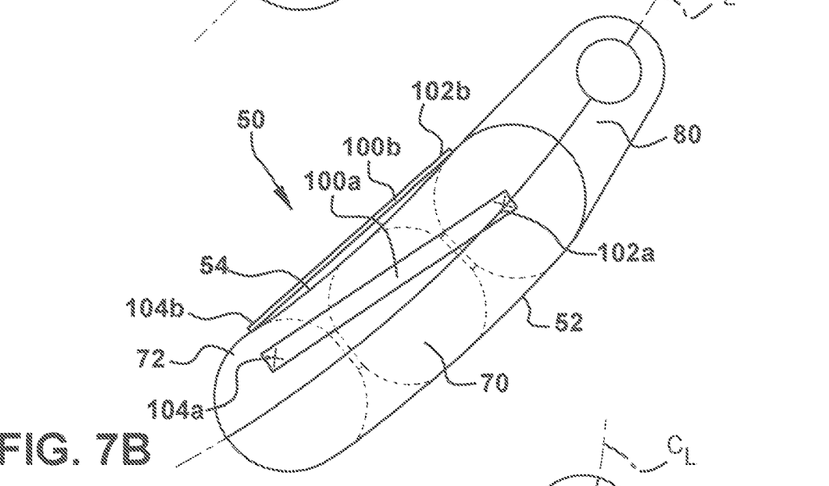
Figure 7C:
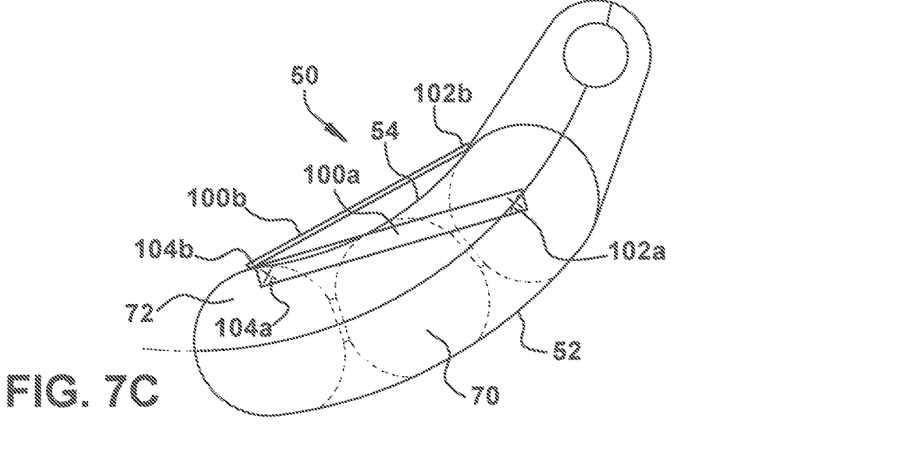

As shown in FIGS. 4 and 7A-C, the knee airbag 50 can include tethers 100a, 100b for helping to control its deployment and position. The tethers 100 are connected to the cushion portion 70 and help to control its deployment, movement, and position. The tethers 100a, 100b have two potential implementations, which are shown in FIGS. 4, 7B, and 7C. In a first implementation, the tethers 100a are connected to opposite lateral portions 72 of the cushion portion 70. The tethers 100a have first ends 102a connected to the lateral end portions 72 of the cushion portion 70 at an upper end of the cushion portion, and opposite second ends 104a connected to the lateral ends of the cushion portion at a lower end of the cushion portion.

In a second implementation, one or more tethers 100b are connected to the rear panel 54 of cushion portion 70. The tethers 100b have first ends 102b connected to the rear panel 54 at an upper end of the cushion portion 70, and opposite second ends 104b connected to the rear panel at a lower end of the cushion portion. In the illustrated example configurations, the tether 100b is a single tether that has a substantial width, as shown in FIG. 4. The tether 100b could, however, be implemented as several tethers with narrower widths.

The tethers 100a, 100b help control the deployment of the knee airbag 50 by limiting movement of portions of the cushion portion 70 to which the tethers are connected. Specifically, the tethers 100a, 100b enforce a curvature of the cushion portion that helps control the positioning of the cushion portion 70 when inflated and deployed. In the example configurations, the lengths of the tethers 100a, 100b are shorter than the distance between the points on the rear panel 54 to which the first and second ends 102a, 102b and 104*a*, 104*b* are connected. As the knee airbag 50 inflates and deploys, movement of the connected portions of the cushion portion 70 are limited and a curve is produced.

Additionally, the positioning of the tethers 100*a* relative to the centerline $C_L$ can be adjusted to help control the curvature of the cushion portion 70. This is shown in FIGS. 7B and 7C. As shown in these figures, the first ends 102*a* are connected on the centerline $C_L$, whereas the second ends 104*a* are shifted relative to the centerline $C_L$. The degree to which the second ends 104*a* are shifted from the centerline $C_L$ can also help control the curvature of the cushion portion 70. As shown, the second end 104*a* of FIG. 7C is shifted further from the centerline $C_L$ than that of FIG. 7B. Because of this, all other dimensions and configurations being the same, the cushion portion 70 of FIG. 7C would have an increased curvature over that of FIG. 7B.

The curvature of the cushion portion 70 helps the knee airbag 50 deploy along and become positioned against the surface of the instrument panel 20 that faces the occupant 14, particularly the occupant's knees/legs 18. The degree of curvature that the cushion portion 70 assumes can be controlled by adjusting the length of the tether 110*a*, 110*b* and/or the distance between the points on the rear panel 54 to which the tethers are connected. This is shown in FIGS. 7B and 7C, which show different degrees of curvature implemented via the tethers 110*a*, 110*b*.

Advantageously, deploying the knee airbag from the upper portion of the instrument panel 22 can allow the knee airbag 50 to more precisely cover the instrument panel 20. Mounting the airbag module 30 at the upper portion of the instrument panel 20 allows the knee airbag 50 to deploy from a position that is closer to the area of the instrument panel where coverage is desired. As a result, the knee airbag 50 can be smaller, both in footprint and inflated volume, which reduces the costs involved in manufacturing the airbag module 30, especially at scale.

Additionally, the downward/forward deployment of the knee airbag 50 helps prevent the occupant from what is known as "submarining," that is, the occupant's knees sliding between the cushion portion 70 and the instrument panel 20, because there is no airbag leading edge gap that the knees can enter. The knee airbag 50 deploys downward and forward into the footwell (see the arrows in FIG. 1), which is away from the occupant, as opposed to footwell mounted knee airbags which inflate toward the occupant, i.e., rearward and upward. A footwell mounted knee airbag thus presents a leading edge of the cushion portion that, during deployment, can be engaged and redirected by the occupant's legs, thus resulting in submarining. For the top-mounted knee airbag 50 disclosed herein, the leading edge travels away from the occupant 14 and the occupant's knees/legs 18, so the opportunity for submarining is eliminated.

The tethers 100 can be connected to the knee airbag 50 in a variety of manners. For example, the first ends 102 of the tethers 100 can be connected to any of the chambers 64 of the knee airbag 50. As shown in FIG. 4, the tethers 100 can be connected to a first chamber 64 that intersects the filling portion 80, to a second chamber behind the first chamber, or to an additional chamber (shown in dashed lines in FIG. 4) as the case may be.

In addition to the functions described above, the tethers 100 can also help enforce a curved configuration of the knee airbag 50, which helps ensure that the airbag deploys to a proper position against the instrument panel 20 and/or following the contour of the instrument panel. This is shown in FIGS. 7A-7C. As shown in FIG. 7A, the first and second ends 102, 104 of the tether 100 are connected to the knee airbag 50 along the centerline $C_L$. The first end 102 is connected to a first chamber 64, i.e., the chamber of the cushion portion 70 that intersects the filling portion 80. Because both ends of the tether are connected along the centerline $C_L$, the restraining force exerted on the cushion portion 70 by the tether 100 is parallel to the centerline $C_L$. As a result, the knee airbag 50 of FIG. 7A, when inflated, has a generally flat configuration, i.e., the centerline $C_L$ is linear.

As shown in FIG. 7B, the second end 104 of the tether 100 is connected to the knee airbag 50 along the centerline $C_L$. The first end 102 of the tether 100, however, is connected to the knee airbag 50, specifically the first chamber 64, above the centerline $C_L$. As a result, tension on the tether 100 when the knee airbag 50 inflates and deploys restricts movement of the first chamber 64, which causes the knee airbag to adopt an upwardly curved configuration (i.e., curved along the centerline $C_L$), as shown in FIG. 7B. The degree of curvature imposed on the knee airbag 50 by the tether 100 can be configured through position of the tether connection to the chamber 64 relative to the centerline $C_L$, and through the length of the tether. According to this configuration, the further the connection of end 102 from the centerline $C_L$ and/or the shorter the tether 100, the higher the degree of bag curvature.

As shown in FIG. 7C, the second end 104 of the tether 100 is connected to the knee airbag 50 along the centerline $C_L$. The first end 102 of the tether 100, however, is connected to the knee airbag 50, specifically the second or end chamber 64, above the centerline $C_L$. As a result, tension on the tether 100 when the knee airbag 50 inflates and deploys restricts movement of the end chamber 64, which causes the knee airbag to adopt an upwardly curved configuration (i.e., curved along the centerline $C_L$), as shown in FIG. 7C. Again, the degree of curvature imposed on the knee airbag 50 by the tether 100 can be configured through position of the tether connection to the chamber 64 relative to the centerline $C_L$, and through the length of the tether. In the configuration of FIG. 7C, it can be seen that the configuration of the length of the tether 100 and/or the location of the tether connection 102 produces a higher degree of curvature than the configuration of FIG. 7B.

Figure 8:
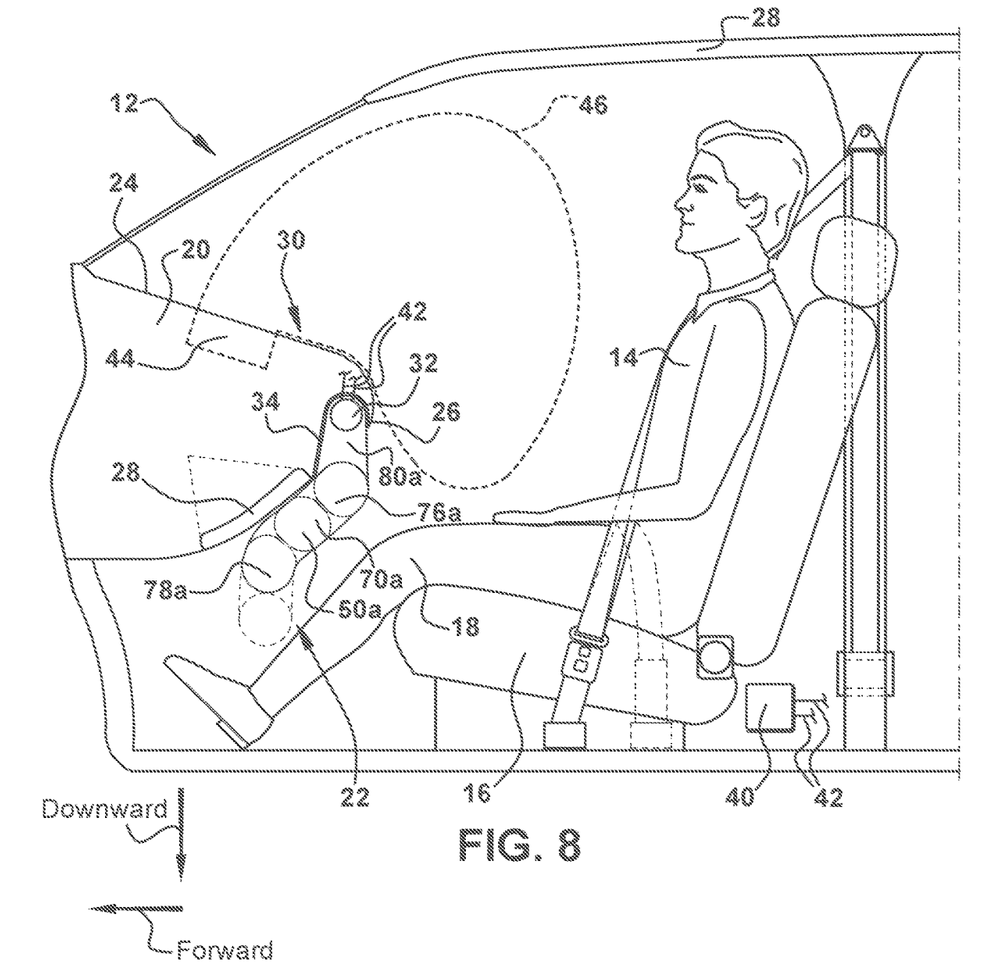
FIG. 8 is a side view that illustrates schematically a vehicle safety system including an apparatus for helping to protect an occupant of a vehicle, according to an alternative configuration.

Another example configuration of the vehicle safety system 10 is illustrated in FIG. 8. As shown in FIG. 8, the vehicle safety system 10 includes a knee airbag 50*a* that differs from that shown and described in FIG. 1 as discussed below. With the exception of the knee airbag 50*a*, the vehicle safety system 10 of FIG. 8 is similar or identical to the system shown and described in FIG. 1. For this reason, the reference numbers used in FIG. 8 are identical to those used in FIG. 1, with the understanding that the description of the vehicle safety system 10 set forth above with regard to FIG. 1 also applies to the vehicle safety system of FIG. 8, again with the exception of the configuration of the knee airbag 50*a*.

As shown in FIG. 8, the knee airbag 50*a* has a curved configuration that differs from that shown in FIG. 1. More specifically, the curvature of an upper portion 76*a* of the cushion portion 70*a* helps the knee airbag 50*a* deploy along and become positioned against the surface of the instrument panel 20 that faces the occupant 14, particularly the occupant's knees/legs 18. According to the configuration of FIG. 8, however, the curvature toward/along the instrument panel occurs along an upper portion 76*a* of the cushion portion 70*a* and the filling portion 80*a*. This curvature can be produced in a manner that is similar or identical to those described above in regard to the configuration of FIGS. 1-7C, for example, through the configurations of the airbag panels, internal tethers, and external tethers, individually or in combination with each other.

The curvature of the upper portion 76a causes the knee airbag 50a to deploy downward and forward along the instrument panel 26 into the footwell 22. Deploying the knee airbag 50a from the upper portion of the instrument panel 22 can allow the knee airbag 50a, particularly the upper portion 76a, to more precisely cover the instrument panel 20. Mounting the airbag module 30 at the upper portion of the instrument panel 20 allows the knee airbag 50a to deploy from a position that is closer to the area of the instrument panel where coverage is desired. As a result, the knee airbag 50a can be smaller, both in footprint and inflated volume, which reduces the costs involved in manufacturing the airbag module 30, especially at scale.

Additionally, the downward/forward deployment of the knee airbag 50a helps prevent the occupant from what is known as "submarining," that is, the occupant's knees sliding between the cushion portion 70a and the instrument panel 20, because there is no airbag leading edge gap that the knees can enter. The knee airbag 50a deploys downward and forward into the footwell (see the arrows in FIG. 8), which is away from the occupant, as opposed to footwell mounted knee airbags which inflate toward the occupant, i.e., rearward and upward. A footwell mounted knee airbag thus presents a leading edge of the cushion portion that, during deployment, can be engaged and redirected by the occupant's legs, thus resulting in submarining. For the top-mounted knee airbag 50a disclosed herein, the leading edge travels away from the occupant 14 and the occupant's knees/legs 18, so the opportunity for submarining is eliminated.

In the configuration of FIG. 8, a lower portion 78a of the knee airbag 50a has a reversed curvature that is downward into the footwell 22. The curvature of the lower portion 78a faces concavely toward the lower legs of the occupant 14, i.e., toward the occupant's feet and lower shin/ankle area of the occupant. As shown in dashed lines in FIG. 8, the extent of the lower portion 78a can be tailored to extend a desired distance into the footwell so as to position the lower portion a desired distance from the lower legs and feet of the occupant. In this regard, the extent of the knee airbag 50a can, for example, be configured with regard to a normally seated occupant of a particular size. For example, the knee airbag 50a can be dimensioned and sized for what is referred to as a 50$^{th}$ percentile male occupant, meaning that the occupant is an average male size (height/weight), with 50% of the population being larger and 50% being smaller. Other occupant sizes, such as 95$^{th}$ percentile males or 5$^{th}$ percentile females, can also be used for design purposes.

Advantageously, the curvature of the lower portion 78a of the knee airbag 50a in FIG. 8, in addition to cushioning the occupant's legs from impacting the instrument panel 22, also helps cushion or otherwise reduce or impede leg whipping in response to vehicle impacts. "Leg whipping" refers to the tendency of the lower legs to bend at the knee and move/extend forward and upward toward the instrument panel 22. By implementing a downward curvature in the lower portion 78a, the lower legs engage the knee airbag 50a early on in the crash event, so that the cushioning against leg whipping occurs sooner. As a result, the knee airbag 50a can help prevent lower leg and knee injuries that might otherwise occur. At the same time, the lower portion 78a and the upper portion 76a of the knee airbag 50a cushions against impacts with the instrument panel 22 in a manner that is similar or identical to that described above in regard to the configuration of FIG. 1.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A knee airbag module for a vehicle, comprising:
   an airbag housing configured to be mounted in an instrument panel of the vehicle at a position adjacent an upper surface and a front surface of the instrument panel;
   a knee airbag comprising overlying panels interconnected along a perimeter connection to define an inflatable volume of the knee airbag; and
   at least one tether configured to control the shape of the knee airbag and/or the trajectory along which the knee airbag inflates and deploys so that the knee airbag, when inflated, extends along a contour of an instrument panel surface facing an occupant of a vehicle seat,
   wherein the knee airbag has a stored condition in the airbag housing and is configured to inflate and deploy in a direction that is downward and forward into a footwell of the vehicle,
   wherein the at least one tether is connected to an external surface of the knee airbag and is configured so that it is free from engaging the instrument panel when the knee airbag is inflated and deployed, and wherein the at least one tether has one end connected to the knee airbag along or near a centerline of the knee airbag, and an opposite end connected to the knee airbag away from the centerline of the knee airbag.

2. The knee airbag module recited in claim 1, wherein the airbag housing is configured to be mounted above a glove box of the instrument panel.

3. The knee airbag module recited in claim 1, wherein the knee airbag is configured to inflate and deploy between the instrument panel and the legs of an occupant, the knee airbag comprising an impact surface configured to face toward the occupant when the knee airbag is inflated, and wherein the knee airbag is configured so that the impact surface extends downward and forward from the airbag housing when the knee airbag is in an inflated and deployed condition.

4. The knee airbag module recited in claim 1, wherein the at least one tether is configured to enforce a curve of the knee airbag that extends away from the occupant.

5. The knee airbag module recited in claim 1, wherein the at least one tether is connected to a panel of the knee airbag configured to face and/or engage an instrument panel surface facing the occupant.

6. The knee airbag module recited in claim 1, wherein the at least one tether has a length and opposite ends spaced along the length, wherein the opposite ends are connected to the airbag at locations on the airbag spaced a distance that is greater than the length of the at least one tether.

7. The knee airbag module recited in claim 1, wherein the at least one tether is configured to become tensioned in response to the knee airbag being inflated, and wherein the at least one tether is configured to enforce a curved configuration of the knee airbag in response to being tensioned in response to the knee airbag being inflated.

8. The knee airbag module recited in claim 1, wherein the knee airbag further comprises a lower portion configured to curve away from the instrument panel into the footwell toward an area in the footwell where an occupant's feet and lower legs are positioned.

9. The knee airbag module recited in claim 1, wherein the knee airbag comprises a filling portion and a cushion portion, the filling portion being configured to receive inflation fluid from an inflator and to direct the inflation fluid from the inflator to the cushion portion, and wherein the cushion portion has a width that is greater than a width of the filling portion, the cushion portion extending laterally beyond the width of the filling portion on opposite sides of the filling portion.

10. The knee airbag module recited in claim 9, wherein the filling portion has a first end configured to receive inflation fluid from the inflator, and the cushion portion is fluidly connected to the filling portion at a second end of the filling portion, opposite the first end of the filling portion.

11. The knee airbag module recited in claim 10, wherein the knee airbag is configured to have a generally T-shape, wherein the filling portion has a length that extends along the centerline of the knee airbag and a width that extends transverse to the length, and the cushion portion has a width that extends transverse to the centerline and laterally beyond opposite lateral sides of the filling portion.

12. The knee airbag module recited in claim 1, wherein the overlying panels are interconnected within the perimeter connection along one or more interior connections that define inflatable chambers within the inflatable volume.

13. The knee airbag module recited in claim 1, wherein the overlying panels comprise flat fabric panels that are similarly or identically patterned, wherein the panels are configured to lie flat in the overlying manner while the perimeter connection and any interior connections within the perimeter connection are formed.

14. The knee airbag module recited in claim 1, wherein the perimeter connection and any interior connections within the perimeter connection are formed by stitching or ultrasonic welding.

15. The knee airbag module recited in claim 1, further comprising an inflator for inflating the knee airbag.

16. A vehicle safety system comprising the knee airbag module recited in claim 15, a sensor configured to sense the occurrence of an event for which deployment of the knee airbag is desired, and a controller configured to actuate the inflator to deploy the knee airbag in response to the sensor.

17. The vehicle safety system recited in claim 16, further comprising a frontal airbag module mounted to the instrument panel above the knee airbag module, the frontal airbag module comprising a frontal airbag configured to extend from above the instrument panel down to the cushion portion of the knee airbag when inflated, the frontal airbag being configured to cover a filling portion of the knee airbag.

18. The vehicle safety system recited in claim 17, wherein the knee airbag module comprises a passenger side knee airbag module and the frontal airbag module comprises a passenger side frontal airbag module.

19. The vehicle safety system recited in claim 17, wherein the frontal airbag is configured to be deployed from the frontal airbag module.

20. The knee airbag module recited in claim 1, wherein the opposite end of the at least one tether is connected to the knee airbag vertically above the centerline of the knee airbag.

21. The knee airbag module recited in claim 1, wherein the one end of the at least one tether is connected to the knee airbag along the perimeter connection of the knee airbag where the overlying panels of the knee airbag are interconnected.

* * * * *